United States Patent [19]
Dimsa et al.

[11] Patent Number: 5,564,657
[45] Date of Patent: Oct. 15, 1996

[54] ELECTRONICALLY CONTROLLED LOCOMOTIVE THROTTLE CONTROLLER INCLUDING REMOTE MULTIPLE UNIT THROTTLE CONTROL

[75] Inventors: Robert D. Dimsa, Elizabeth; Gary L. Bailey, Baden; Gregory S. Balukin; Vincent Ferri, both of Pittsburgh; Robert J. Jenets, North Huntingdon; Paul J. Kettle, Jr., Pittsburgh; Craig A. Miller, Pittsburgh; Daniel J. Wolf, Pittsburgh, all of Pa.

[73] Assignee: Westinghouse Air Brake Company, Wilmerding, Pa.

[21] Appl. No.: 340,525

[22] Filed: Nov. 16, 1994

[51] Int. Cl.$^6$ .................................................. B61L 3/00
[52] U.S. Cl. ................ 246/187 A; 246/182 B; 246/182 C; 246/191; 246/167 R; 105/61
[58] Field of Search ................ 246/167 R, 186, 246/187 R, 187 A, 191, 182 C; 105/61

[56] References Cited

U.S. PATENT DOCUMENTS

| | | |
|---|---|---|
| 3,696,758 | 10/1972 | Godinez ................................... 105/61 |
| 3,715,579 | 2/1973 | Eblovi . |
| 3,794,834 | 2/1974 | Auer et al. . |
| 3,805,056 | 4/1974 | Birkin . |
| 4,041,283 | 8/1977 | Mosier ..................................... 105/61 |
| 4,181,943 | 1/1980 | Mercer .............................. 246/182 C |
| 4,344,138 | 8/1982 | Frasier ................................... 105/61 |
| 4,344,364 | 8/1982 | Nickles et al. ........................... 105/61 |
| 4,360,873 | 11/1982 | Wilde et al. ............................. 105/61 |
| 4,401,035 | 8/1983 | Spigarelli et al. ....................... 105/61 |
| 5,016,840 | 5/1991 | Bezos . |

Primary Examiner—Mark T. Le
Attorney, Agent, or Firm—James Ray & Associates

[57] ABSTRACT

An electrically controlled railway locomotive throttle controller including a power source connected to a central processing unit disposed on such locomotive. An encoder device is disposed on such locomotive for providing at least one electrical signal to such central processing unit. This at least one electrical signal being at least one of a signal indicative of a throttle position, a signal indicative of dynamic braking and a signal indicative of a reverser. A digital control device is disposed on such locomotive and is connected to receive a signal from such central processing unit to provide a digital control signal that controls the voltage being applied to a trainline. An analog control device is also disposed on such locomotive and is connected to receive a signal from such central processing unit to provide an analog control signal that controls a dynamic brake reference voltage being applied to such trainline.

12 Claims, 2 Drawing Sheets

ELECTRONICALLY CONTROLLED LOCOMOTIVE THROTTLE CONTROLLER INCLUDING REMOTE MULTIPLE UNIT THROTTLE CONTROL

CROSS REFERENCE TO RELATED APPLICATIONS

The invention taught in this patent application is closely related to the inventions taught in the following co-pending patent applications: Ser. No. 08/340,651 "Method And Apparatus For Determining And Encoding The Position Of A Reverser Handle On A Locomotive Control Stand" now U.S. Pat. No. 5,519,299; Ser. No. 08/340,235 "Digital Output Control Device and Method For Operating"; Ser. No. 08/340,239 "Method And Apparatus For Feedback of Trainline Status To The Central Processor Of A Locomotive throttle Controller"; Ser. No. 08/340,215 "Apparatus For Interlocking Throttle, Dynamic Brake And Reverser Handles On A Control Stand Of A Railway Locomotive, now U.S. Pat. No. 5,492,511; Ser. No. 08/340,652 "Method Of Performing Diagnostics On An Electronically Controlled Railway Locomotive Throttle Controller"; Ser. No. 08/340,237 "Method Of Operating A Locomotive Mounted Throttle Controller Between Two Modes Of Operation Including A Transition Between Such Two Modes" now U.S. Pat No. 5,500,799; Ser. No. 08/340,742 "An Apparatus For And A Method Of Generating An Analog Signal For Control Of Dynamic Braking"; Ser. No. 08/340,232 "An Apparatus For Feedback Of An Analog Signal Used To Monitor And/Or Control Dynamic Braking And Method Of Operating"; Ser. No. 08/340,213 "An Apparatus To Enable Controlling A Throttle Controller From A Remote Host"; Ser. No. 08/340,538 "Apparatus For Interlocking Reverser Handle On A Control Stand Of A Railway Locomotive"; and, Ser. No. 08/340,526 "Apparatus For Determining The Absolute Position Of Throttle, Dynamic Brake And Reverser Handles On A Locomotive Control Stand". Additionally, the teachings of each of these patent applications is incorporated herein by reference thereto.

The above patent applications describe portions of the system disclosed in the present invention and are useful for a person skilled in the art for implementing the present invention.

FIELD OF THE INVENTION

The present invention relates, in general, to throttle controller assemblies that are used on railway type locomotives and, more particularly, the instant invention relates to an electronically controlled railway locomotive throttle controller assembly having the capability of remote multiple unit throttle control.

BACKGROUND OF THE INVENTION

As is generally well recognized in the railway industry, prior to the present invention, the throttle controller assemblies which are used in a railway type locomotive are almost exclusively mechanical type throttle controllers. Such mechanical type throttle controller assemblies normally utilize a number of mechanical devices in order to achieve actuation of the necessary microswitches and/or contacts. It is quite well known, for example, that cams are used extensively in this application in order to achieve the required actuation of the various microswitches and/or contacts present in the mechanical type throttle controller.

The mechanical type throttle controllers, presently in use on railway locomotives, have a number of relatively serious drawbacks and/or limitations. These limitations have become more pronounced as the length of freight trains has grown in modern railroading, because the use of more and more locomotives are now required in a train consist in order to pull and/or push the added loads being hauled. For example, these mechanical type throttle controllers utilize either microswitches or contacts to control the voltage that is being applied to the trainline. Furthermore, there is no provision in these prior art mechanical throttle controllers for possible shut down of the system in the event of an output over current.

Additionally, these mechanical type throttle controllers are not equipped to provide the operator of the locomotive with any important feedback information and, consequently, they may not recognize a potential failure situation. Throttle controllers of the mechanical type also utilize either a resistive type voltage divider or a high power potentiometer in order to control the voltage and they are not equipped for shutdown of voltage regulation.

The prior art mechanical throttle controllers provide labels over the mechanical handles to convey only the position of the handle to the locomotive operator. However, these mechanical throttle controllers are not equipped to display certain other relevant information such as various diagnostic information, status information and/or warning type messages.

Furthermore, in a situation where it is either desirable or necessary to provide the required throttle control from a remote host over the communication lines, the currently used mechanical type throttle controllers require that a number of additional relays be used.

It can be seen from the above discussion of the mechanical type throttle controller assemblies presently used in the railroad industry that there is an unfilled need which exists in the railroad industry for an improved railway locomotive type throttle controller assembly which will provide both enhanced performance capability, additional functions which are not possible to accomplish with the prior art mechanical type throttle controllers and more consistent reliability.

SUMMARY OF THE INVENTION

The present invention provides an electronically controlled railway type locomotive throttle controller assembly. Such electronically controlled railway locomotive throttle controller assembly includes a source of power which is disposed on such railway locomotive. There is a central processing unit, also, disposed on such railway locomotive that is electrically connected to such power source. A first means is disposed on such railway locomotive and electrically connected to the central processing unit for providing at least one predetermined electrical signal to the central processing unit. Such at least one predetermined electrical signal being at least one of an electrical signal that is indicative of a throttle position, an electrical signal that is indicative of dynamic braking and an electrical signal that is indicative of a reverser. In addition, there is a second means disposed on such railway locomotive which is connected to receive a signal from the central processing unit that provides a digital control signal which will control the voltage being applied to a trainline. Finally, there is a third means disposed on such railway locomotive that is connected to receive a signal from such central processing unit which provides an analog control signal to control the dynamic brake reference voltage that is being applied to such trainline.

OBJECTS OF THE INVENTION

It is, therefore, one of the primary objects of the present invention to provide an improved electronically controlled railway locomotive type throttle controller which can be retrofitted onto an existing locomotive, regardless of the age of such locomotive, with relative ease.

Another object of the present invention is to provide an improved electronically controlled railway locomotive type throttle controller which provides additional desirable functions and capabilities for improved throttle control that are not possible in the mechanical type locomotive throttle controllers presently in use.

Still another object of the present invention is to provide an improved electronically controlled railway locomotive type throttle controller which will at all times provide for a substantially positive identification of the various handle positions on the throttle controller.

Yet another object of the present invention is to provide an improved electronically controlled railway locomotive type throttle controller which, if desired, can have incorporated therein a safety interlocking feature at the software/microprocessor level, such as, for providing a time-out delay between the throttle and the dynamic brake and for the detection of an invalid reverser state.

It is a still further object of the present invention to provide an improved electronically controlled railway locomotive type throttle controller which, if desired, can have incorporated therein certain predetermined digital diagnostic capabilities.

Still yet another object of the present invention is to provide an improved electronically controlled railway locomotive type throttle controller which, if desired, can have incorporated therein certain predetermined analog diagnostic capabilities.

An additional object of the present invention is to provide an improved electronically controlled railway locomotive type throttle controller which, if desired, can incorporate local protection means therein.

Yet still another object of the present invention is to provide an improved electronically controlled railway locomotive type throttle controller which has incorporated therein a display device to inform the operator of the locomotive about important preselected events and occurrences.

A still further object of the present invention is to provide an improved electronically controlled railway locomotive type throttle controller which, if desired, may have incorporated therein control capability from a remote host.

Yet a further object of the present invention is to provide an improved electronically controlled railway locomotive type throttle controller which is significantly more reliable than presently used mechanical type throttle controllers.

It is an additional object of the present invention to provide an improved electronically controlled railway locomotive type throttle controller which is capable of providing for positive handle setting location.

A still further object of the present invention is to provide an improved electronically controlled railway locomotive type throttle controller which will generally require a minimum amount of maintenance when compared to the prior art type mechanical throttle controllers.

It is an additional object of the to provide an improved electronically controlled railway locomotive type throttle controller which will operate effectively in the rather hostile environment found in a railway locomotive.

In addition to the various objects and advantages of the present invention described above, various other objects and advantages of the electronically controlled railway locomotive throttle controller will become more readily apparent to those persons who are skilled in the art from the following more detailed description of the invention, particularly, when such description is taken in conjunction with the attached drawing figure and with the appended claims.

BRIEF DESCRIPTION OF THE PRESENTLY PREFERRED EMBODIMENT OF THE INVENTION

Figure 1:
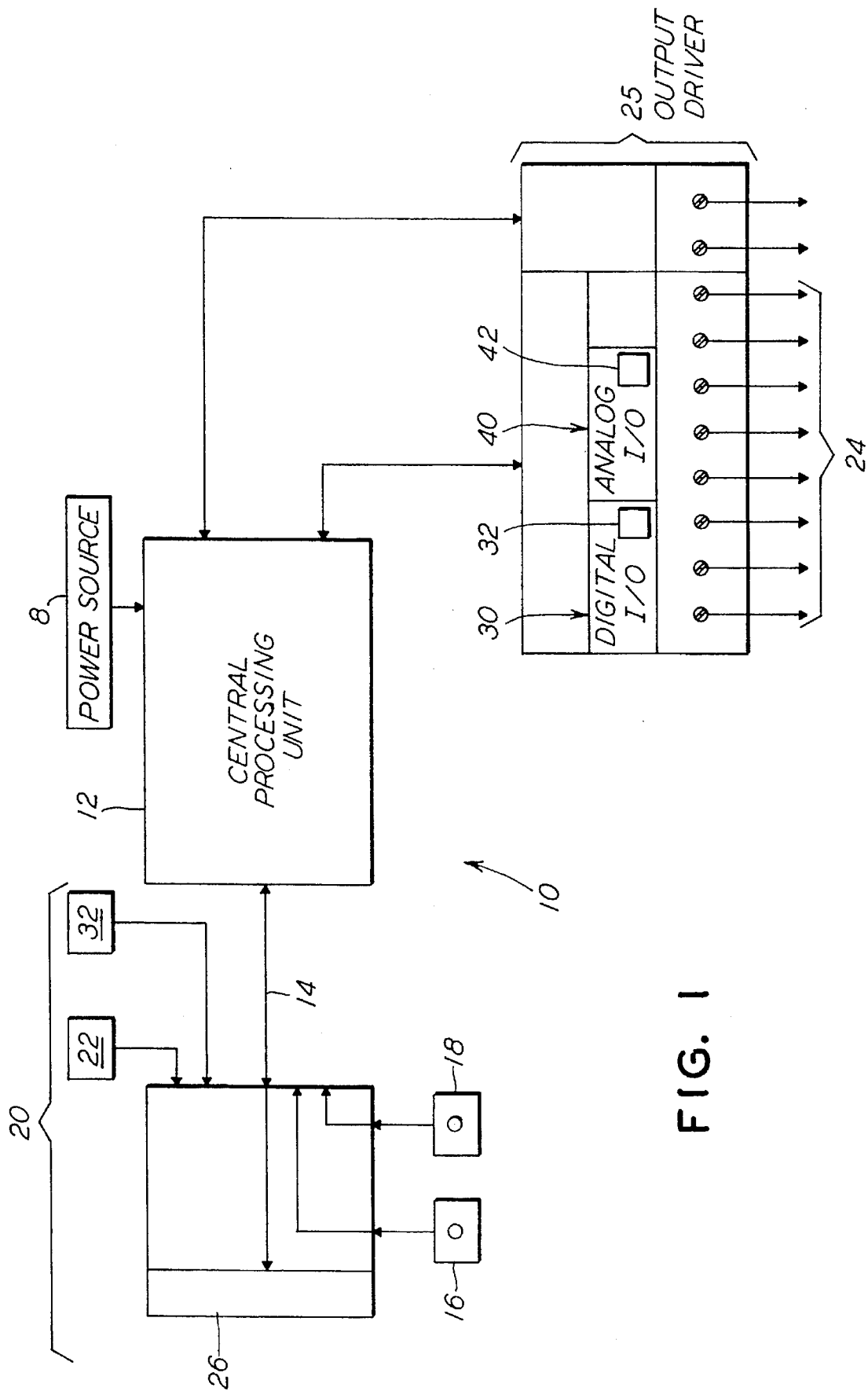
FIG. 1 shows the electronically controlled locomotive throttle controller assembly including the control console and output driver stage.

Reference is now made, more particularly, to the single FIG. 1 Shown therein is an electronically controlled railway locomotive type throttle controller assembly, generally designated 10, which is constructed according the presently preferred embodiment of the invention. It should be noted that the throttle controller assembly 10, of the present invention, includes a remote multiple unit type throttle control capability. This remote multiple unit throttle control capability will become more clear hereinafter as the detailed description of the invention proceeds.

The railway locomotive type throttle controller assembly 10 includes means for connecting it to a source of electrical power disposed on such railway locomotive (not shown). There is a central processing unit 12 disposed on such railway locomotive. Such central processing unit 12 is electrically connected to such power source. In the presently preferred embodiment of the invention, such central processing unit 12 will generally be a microprocessor.

A first means, generally designated 20, is disposed on such railway locomotive. First means 20 is electrically connected via line 14 to provide at least one electrical signal to the central processing unit 12. Such at least one electrical signal will be selected from at least one of an electrical signal which is indicative of a throttle handle 16 position, an electrical signal which is indicative of dynamic braking 18 and an electrical signal which is indicative of a reverser handle 22 position. In the presently most preferred embodiment, the first means 20 will be an encoder assembly. Details of the encoder assembly are as taught in the following copending applications, which are cited above:

(1) Method And Apparatus For Determining And Encoding The Position Of A Reverser Handle On A Locomotive Control Stand;

(2) Apparatus For Interlocking Throttle, Dynamic Brake And Reverser Handles On A Control Stand Of A Railway Locomotive;

(3) Apparatus For Interlocking Reverser Handle On A control Stand Of A Railway Locomotive; and (4) Apparatus For Determining The Absolute Position Of Throttle, Dynamic Brake And Reverser Handles On A Locomotive Control Stand.

Although not limited thereto, the encoder assembly will, preferably, include each of the throttle handle assembly 16 position, the dynamic brake 18 and such reverser handle 22 position.

The electronically controlled throttle controller assembly 10, according to the presently preferred embodiment of the invention, will further include, as at least a portion of the first means 20, a visual display means 26. Such visual display means 26 displays certain preselected information to the operator or engineer of such railway locomotive. Although the present invention is not to be limited thereto or thereby, the preferred visual display means 26 is a liquid crystal type display device. It is to be understood that such preselected information to be displayed on the visual display means 26 will, preferably, include at least one of certain diagnostic type information, status type information and warning type messages.

The electronically controlled throttle controller 10 further includes a second means, generally designated 30, which is disposed in output driver stage 25 on such railway locomotive and is connected to receive a low level digital output signal through communication lines 15 from such central processing unit 12. Such second means 30 provides an output digital control signal that will control the voltage which is being applied to a trainline 24.

The second means 30, in the presently preferred embodiment of the invention, will further include a local protection means 32. This local protection means 32 provides the capability of shutting down a digital output signal if a preset predetermined level of at least one of voltage and current is exceeded in the system for any reason. Details regarding the second means are as taught in the following copending applications which are cited above:

(1) Digital Output Control Device And Method For Operating; and (2) Method And Apparatus For Feedback Of Trainline Status To The Central Processor Of A Locomotive Throttle Controller.

The throttle controller assembly further includes a third means 40 disposed in output driver stage 25 connected to receive from the central processor unit 12 a low level analog output signal through communication lines 15. The third means provides an analog output control signal that controls the dynamic brake reference voltage which is being applied to a trainline 24.

Such third means 40, in the presently preferred embodiment of the electronically controlled throttle controller assembly, will have a local protection means 42 incorporated therein. Such local protection means will shut down the analog output signal if a preset predetermined level of at least one of voltage and current is exceeded for any reason.

Details regarding the third means are as taught in the following copending applications which are cited above:

(1) An Apparatus For And A Method Of Generating An Analog Signal For Control Of Dynamic Braking; and (2) An Apparatus For Feedback Of An Analog Signal Used To Monitor And/Or Control Dynamic Braking And Method Of Operating.

Figure 2:
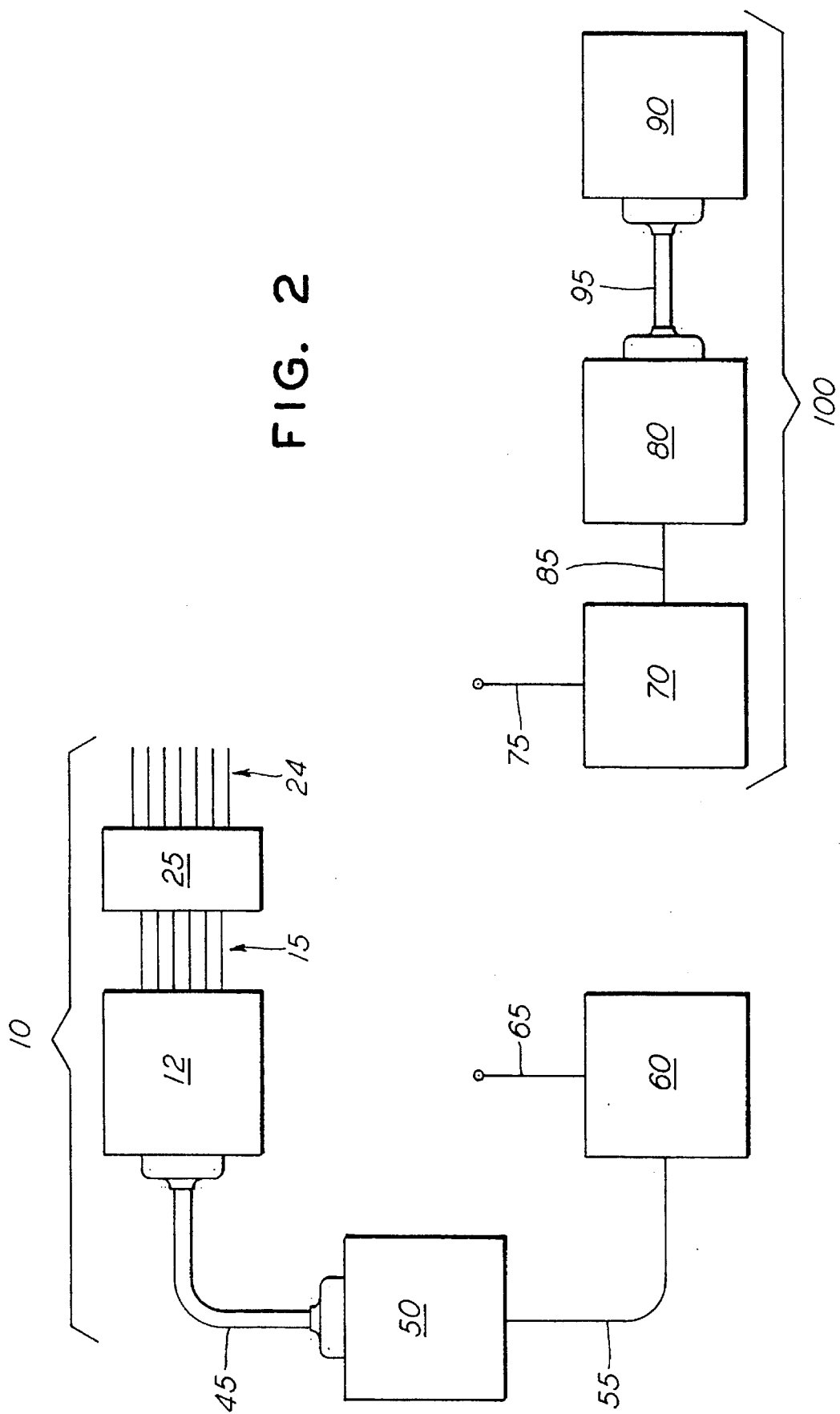
FIG. 2 shows the electronically controlled locomotive throttle controller assembly including radio connection to a remote unit.

FIG. 2 shows an overall view of the throttle controller assembly 10 with means for communication with a remote unit 100, which may be a remote host controlling the throttle controller 10. Central processor 12 is shown which passes low level analog and digital signals through communication lines 15 to an output driver stage 25, to drive digital and analog control signals on trainlines 24.

The central processor 12 communicates two way information through communication path 45, which may be a serial communication line, such as an RS-232 connection. This is connected to a radio interface unit 50, which may be a part of an electronic braking apparatus such as the WABCO Epic® braking system.

The radio interface unit 50 provides a modulated signal 55 to radio 60 for transmission through antenna 65.

Although not limited thereby, a similar system could be installed in remote unit 100. Central processor 90 in remote unit 100 communicates via communication path 95 which may be a serial communication path, such as an RS-232 connection to radio interface unit 80. This communicates with radio 70 through modulated signal 85. Radio 70 communicates through antenna 75 to antenna 65 and radio 60 in throttle controller 10.

Further details regarding communication of throttle controller 10 with remote unit 100 are as taught in the following copending application which is cited above: *An Apparatus For Controlling A Throttle Controller From A Remote Host.*

Furthermore, in the best mode presently contemplated for the invention, such electronically controlled railway locomotive type throttle controller assembly 10 will be further equipped with an analog feedback diagnostic means. Such analog feedback diagnostic means will read the status of voltage which is being applied to such trainline. In addition, such analog feedback diagnostic means provides the capability of regulating the voltage output regardless of the load over an operating range of such trainline. It is further preferable that such analog feedback diagnostic means will at least include each of a converter and a comparator.

Such electronically controlled railway locomotive throttle controller assembly 10, in the presently preferred embodiment of the invention, will also further include a master shutdown relay device 34. This master shutdown relay device 34 is responsive to such central processing unit 12.

It is likewise presently preferred that such electronically controlled railway locomotive throttle controller assembly 10 will further be equipped with at least one backup emergency shutdown means.

In the mode for carrying out this invention which is presently regarded as being the best mode, the locomotive throttle controller 10 determines handle positions for the throttle 16, dynamic brake 18 and reverser 22 by a first means 20 which is an encoder. The encoder 20 is connected to a central processing unit 12. It is preferred that the first means 20 have a visual display means 26 such as a liquid crystal display for displaying certain diagnostic information, status information, and warning messages.

In the best mode, a second means 30 is provided which receives digital output signals from the central processing unit on low level signal lines 15, and which controls the digital output signal applied to at least one of the trainlines 24. This second means 30 has local protection 32 for shutting down its digital output signal if current or voltage are exceeded. In the best mode, a feedback diagnostic means is provided as a part of the second means for feeding back to the central processor 12 unit a signal indicating the digital voltages applied to the trainlines 24. A converter and a comparator (not shown) are used to ensure that the digital signal sent out on the trainlines 24 by the second means 30 corresponds to the low level digital output signals on lines 15 from the central processor unit 12. It is preferred that if there is a discrepancy it is indicated on the visual display means 26.

Also, in the best mode, a third means 40 is provided which receives low level analog signals on lines 15 from the central processor unit 12 and which provides analog output control signals that control the dynamic brake reference voltage which is applied to a trainline 24.

In the best mode, a feedback diagnostic means is provided as part of the third means 40 to ensure that the analog voltage signal which is applied to a trainline 24 corresponds to the analog signal sent from the central processor 12 unit to the third means 40. It is preferred that if there is a discrepancy, it is indicated on the visual display means 26. It is preferred that the third means 40 have local protection means 42 to shut down the voltage applied to a trainline if a preset level of voltage or current is exceeded.

In accordance with the best mode for carrying out this invention, an emergency shutdown relay 34, and a backup emergency shutdown relay 32 are provided to shut the throttle controller 10 down in the event of certain emergency conditions.

It is readily apparent from the above description of the electronically controlled railway locomotive type throttle controller that it meets the unfilled need which exists in the railroad industry for an improved railway locomotive type throttle controller assembly which will provide both enhanced performance capability, additional functions which are not possible to accomplish with the prior art mechanical type throttle controllers and more consistent reliability.

While a presently preferred and various other alternative embodiments of the instant invention have been described in considerable detail above, with particular reference to the attached drawing figure, it should be understood that various additional adaptations and modifications of the electronically controlled railway locomotive throttle controller assembly can be both envisioned and made by those persons who are skilled in the railway electronics control art without departing from the spirit or scope of the appended claims.

In the following claims, the adjectives "such" and "said" are used to refer to things which have been previously mentioned. The adjective "said" is used to refer to parts of the invention which have been previously mentioned, and the adjective "such" is used to refer to parts of the environment of the invention which have been previously mentioned.

We claim:

1. An electronically controlled throttle controller assembly for a railway locomotive, said electronically controlled throttle controller assembly comprising:

(a) a power source disposed on such railway locomotive;

(b) a central processing unit disposed on such railway locomotive and connected to said power source;

(c) a first means disposed on such railway locomotive for providing at least one electrical signal to said central processing unit, said at least one electrical signal being one of a signal indicative of a throttle position, a signal indicative of dynamic braking and a signal indicative of a reverser;

(d) a second means disposed on such railway locomotive and connected to receive a digital output signal from said central processing unit for providing a digital control signal that controls voltage being applied to a trainline;

said second means generating a first feedback signal indicative of said digital control signal, said first feedback signal connected to said CPU;

(e) a third means disposed on such railway locomotive and connected to receive an analog output signal from said central processing unit for providing an analog control signal that controls a dynamic brake reference voltage being applied to such trainline;

said third means generating a second feedback signal indicative of said dynamic brake reference voltage, said second feedback signal connected to said CPU;

(f) means disposed in said CPU for comparing said first feedback signal to signals in said CPU to actuate at least one emergency procedure;

(q) means disposed in said CPU for comparing said second feedback signal to signals in said CPU; to actuate said at least one emergency procedure;

(h) a radio interface unit;

(i) a serial digital interface connecting said CPU to said radio interface unit; and (j) a two-way radio connected to said radio interface unit, said two-way radio for communication with a remote unit.

2. An electronically controlled railway locomotive throttle controller assembly, according to claim 1, wherein said central processing unit is a microprocessor.

3. An electronically controlled railway locomotive throttle controller assembly, according to claim 1, wherein said remote unit includes an electronically controlled brake device.

4. An electronically controlled railway locomotive throttle controller assembly, according to claim 2, wherein said first means is an encoder device.

5. An electronically controlled railway locomotive throttle controller assembly, according to claim 4, wherein said first means further includes a visual display means for displaying certain preselected information to an operator of such railway locomotive.

6. An electronically controlled railway locomotive throttle controller assembly, according to claim 5, wherein said visual display means is one of a liquid crystal display device and a light emitting diode.

7. An electronically controlled railway locomotive throttle controller assembly, according to claim 5, wherein said preselected information includes at least one of diagnostic, status and warning messages.

8. An electronically controlled railway locomotive throttle controller assembly, according to claim 2, wherein said second means includes a local protection means for shutting down an output if a preset level of at least one of voltage and current is exceeded.

9. An electronically controlled railway locomotive throttle controller assembly, according to claim 2, wherein said third means includes a local protection means for shutting down an output if a preset level of at least one of voltage and current is exceeded.

10. An electronically controlled railway locomotive throttle controller assembly, according to claim 2, wherein said throttle controller assembly further includes a master shutdown relay device which is responsive to said central processing unit.

11. An electronically controlled railway locomotive throttle controller assembly, according to claim 2, wherein said throttle controller assembly further includes at least one backup emergency shutdown means.

12. An electronically controlled railway locomotive throttle controller assembly, according to claim 1, wherein said radio interface unit is included in an electrically controlled braking unit.

* * * * *

UNITED STATES PATENT AND TRADEMARK OFFICE
CERTIFICATE OF CORRECTION

PATENT NO. : 5,564,657
DATED : October 15, 1996
INVENTOR(S) : Robert D. Dimsa, et al.

It is certified that error appears in the above-identified patent and that said Letters Patent is hereby corrected as shown below:

Column 4, line 3, after "the", please insert --present invention--;
column 4, line 29, please delete "the single";
column 4, line 30, after "FIG.1", please insert --.--;
column 4, line 32, after "according", please insert --to--.
Column 5, line 1, please delete "Of" and insert --Of--.
Column 7, line 36, please delete "ǂsuch"" and insert --"such"--.
Column 8, line 10, please delete "(q)" and insert --(g)--.

In the abstract, line 1, please delete "electrically" and insert --electronically--.

Signed and Sealed this

Twenty-first Day of July, 1998

Attest:

Attesting Officer

BRUCE LEHMAN

Commissioner of Patents and Trademarks